Aug. 7, 1928.
C. H. SCHURR
1,680,258
PROCESS OF GENERATING OR GRINDING GEAR TEETH
Filed June 21, 1923   2 Sheets-Sheet 1
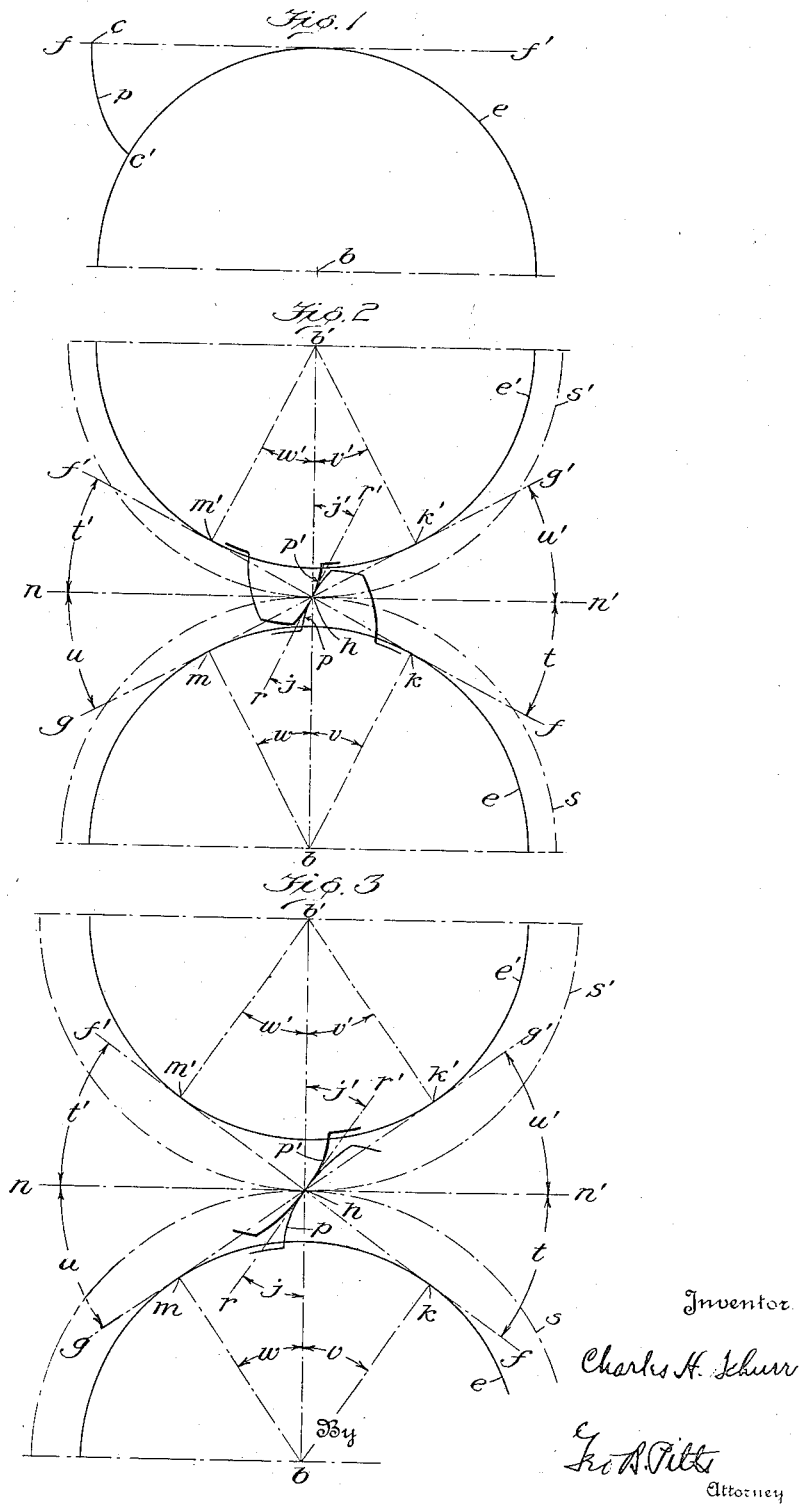
Inventor
Charles H. Schurr
By
Attorney

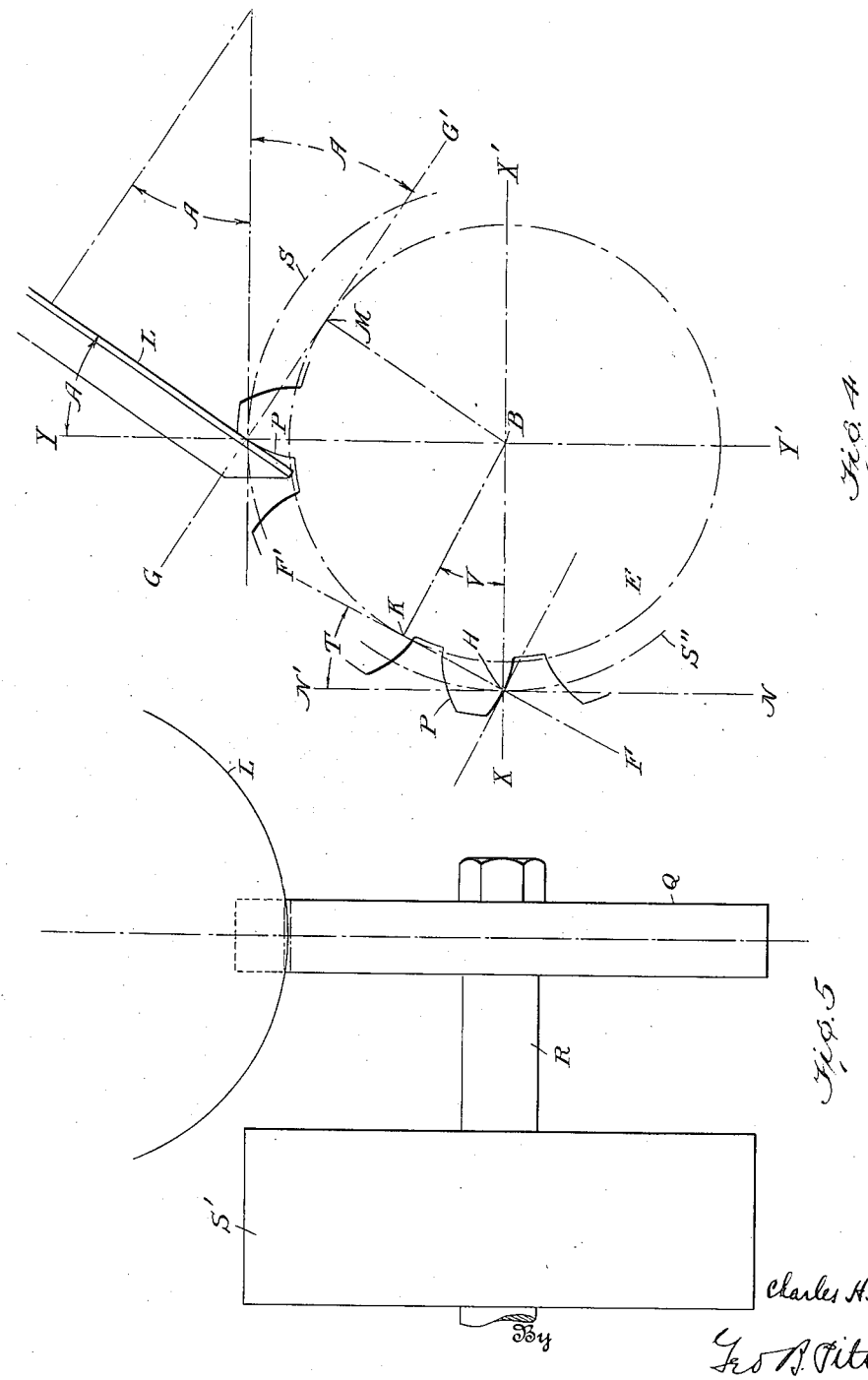

Patented Aug. 7, 1928.

1,680,258

UNITED STATES PATENT OFFICE.

CHARLES H. SCHURR, OF CLEVELAND, OHIO.

PROCESS OF GENERATING OR GRINDING GEAR TEETH.

Application filed June 21, 1923. Serial No. 646,922.

This invention relates to an improved method or process of generating or grinding the teeth of involute gears, and has for one of its objects a simplification of processes heretofore known, whereby machines for carrying out the process may be simplified in construction and more readily manipulated for cutting or grinding the teeth of different sized gears.

One novel characteristic of this invention resides in the provision of a method or process by which involute gears of any pitch and any number of teeth and any pressure angle may be generated by a machine tool having a fixed pressure angle.

Another object of the invention is to provide an improved process by which gears having different pitch diameters and teeth of different pressure angles may be generated or ground by a tool having a fixed pressure angle other than the one preselected for the gear.

In the accompanying drawings, which show diagrammatically the method of calculating the various factors used in setting a machine and its tool for generating or grinding the desired tooth form or faces, Fig. 1 is a diagram showing the general method of obtaining the involute curve. Figs. 2 and 3 respectively show two gears meshing together, the gears in each case being represented as having the same base circle diameter, but the two views showing different center distances. Fig. 4 shows graphically a method whereby the tool at a fixed angle is caused to generate or grind a gear of a different preselected pressure angle. Fig. 5 is a view showing the operative elements of the machine in their adjusted position, looking toward the right of Fig. 4.

It will be understood that this process is applicable for generating or grinding the teeth of involute gears. Accordingly, in the use of the terms generating and cutting herein, I wish to comprehend the making of gears by any sort of generating tool as well as the finishing or grinding thereof.

In Fig. 1, when a line $ff'$ tangent to a circle $e$ is moved in the direction of its own length and, without slipping upon the circle, rotates the circle and its plane thereby about its axis $b$, any point such as $c$ in the line $ff'$ will trace the curved path $cc'$ in the plane of the circle. This curved path $cc'$ will be the involute $p$ for that circle, and the circle is called the "base circle" for this involute curve.

In Fig. 2, two base circles $ee'$ are laid off at a center distance $bb'$; and the common internal tangents $ff'$ and $gg'$ are drawn. These tangents meet at a point $h$ on the center line $bb'$. Through point $h$, the two pitch circles $s$ and $s'$ are drawn.

Assuming that tangent $ff'$ is moved in the direction of its own length, and that circles $e$ and $e'$ are thereby rotated upon their respective centers $b$ and $b'$ at a peripheral velocity equal to the velocity of line $ff'$, it will be seen that a point such as for example $h$, in line $ff'$, will trace the involutes $p$ and $p'$ of the respective circles $e$ and $e'$. Since both of these curves $p$ and $p'$ are traced by the same point, it is evident that the two curves will at all times be in contact with each other at this point as the gears are rotated and the line $ff'$ moves. Assuming that $p$ and $p'$ are gear tooth faces, it is evident that they will transmit a uniform peripheral speed from circle $e$ to circle $e'$, or vice versa.

Line $rr'$ is drawn through point $h$ and tangent to both curves $pp'$. By construction of the involute, the infinitesimal increment of the involute curve formed as the line $ff'$ moves as above described is always at right angles to the latter; therefore line $rr'$ is normal to line $ff'$ at point $h$. Any pressure exerted on one of these two tooth faces by the other tooth face must act upon the line perpendicular to their common tangent $rr'$; or in other words, along the line $ff'$ which is called the "line of action." The angle $t$ or $t'$ between this line of action $ff'$ and the common internal tangent $nn'$ of the circles $s$ and $s'$ is called the "pressure angle." It may likewise be shown that involute curves similar to $p$ and $p'$ may be traced by any point in the line $gg'$, and that the angles $u$ and $u'$ between $gg'$ and $nn'$ are also equal to the pressure angle.

Perpendiculars dropped from $b$ and $b'$ to $ff'$ and $gg'$ respectively will form the radii $bk$ and $bm$ of circle $e$, and $b'k'$ and $b'm'$ of circle $e'$. Let angle $hbk$ be represented by $v$, angle $hbm$ by $w$, angle $hb'k'$ by $v'$, and angle $hb'm'$ by $w'$. Then, (1) $\angle v = \mathrm{rt} \angle$ less $\angle bhk$ (2 $\angle$s of rt $\angle \triangle$);
(2) $\angle t = \mathrm{rt} \angle$ less $\angle bhk$ (2 $\angle$s of rt $\angle \triangle$);

therefore:

(3) $\angle v = \angle t$.

It may likewise be shown that:
(4) $\angle v' = \angle u'$
(5) $\angle w = \angle u$
(6) $\angle w' = \angle t'$
also:
(7) $\angle u' = \angle t' = \angle t = \angle u$;
hence all these angles are equal to the pressure angle.

Angles $j$ and $j'$ are formed by the lines $rr'$ and $bb'$; and
(8) $\angle j$ plus $\angle bhk$ = rt $\angle$
(9) $\angle t$ plus $\angle bhk$ = rt $\angle$
hence
(10) $\angle j = \angle t$ or the pressure angle;
since
(11) $\angle j = \angle j'$ ($\angle$s),
therefore:
(12) $\angle j' = \angle j = \angle t$.

Considering $e$ and $e'$ as the base circles of a pair of mating involute gears, $s$ and $s'$ will be the pitch circles of these gears, curves $pp'$ will be the tooth faces, and the line $rr'$ will represent one side of the rack tooth.

It will be noted that although by construction the circles $e$ and $e'$ were made of the same diameter for ease of analysis, yet the geometrical proof above given does not require that $bh$ be equal to $b'h$; that is, the relative diameters of the pitch circles are not factors in the proof, and any gear ratio may be adopted.

(13) $\triangle bhk \sim \triangle b'hk'$ (rt $\triangle$s and $v=v'$)
therefore:
(14) $bh : bk :: b'h : b'k'$.

Having made the velocity of the base circle $e$ equal to the velocity of the base circle $e'$, we now know that the pitch circles $s$ and $s'$ have equal velocities, since their radii are proportional.

Fig. 3 is constructed exactly like Fig. 2, except that a greater center distance $bb'$ is selected. The same reference characters are used as with Figs. 1 and 2; the base circles $e$ and $e'$ retain the same diameter as in Fig. 2, while the distance $bb'$ may be any distance greater than the distance $bb'$ used in Fig. 2. All of the foregoing statements will apply to Fig. 3 as to Fig. 2. It will be seen that the pitch circles increase in diameter proportionally as the center distance, and that a greater pitch circle radius about the same base circle produces a greater pressure angle.

No pressure angle nor pitch circle are shown in Fig. 1, as these are functions of the center distance and a gear acquires a pitch diameter, pitch, and pressure angle only when meshed with another gear, rack or generating tool.

From the above it will be seen that the establishment of the pitch circle ($s$) establishes a corresponding pressure angle ($v$), or the establishment of a pressure angle establishes a corresponding pitch circle, the diameter of which is found by solution of the right triangle $bhk$. Since the angle $v$ and the side $bk$ are known, we may find the side $bh$, or the radius of $s$, as follows:

(15) $\cos v = \dfrac{bk}{bh}$

Transposing,
(16) $bh = \dfrac{bk}{\cos v}$.

Hence, the radius of the pitch circle equals the base circle radius divided by the cosine of the pressure angle.

Thus it is evident that a given gear might be meshed successively with a similar gear on any number of different center distances, in each case establishing a new pitch circle and pressure angle. Likewise this gear might be generated by a tool of a given pressure angle on the corresponding pitch circle, and then meshed with another gear at a different pressure angle and corresponding pitch circle.

The designer usually preselects the "rolling pitch circle" diameter and center distance at which the two gears are to mesh, and a pressure angle, thus establishing a base circle diameter which may be calculated from equation (16) above. A graphic method of doing this is shown in Fig. 4. Here the rolling pitch circle S'' is laid off at the given diameter about a center B. The tangent NN' is drawn through a point H in this circle, and line FF' is drawn to form the given pressure angle T with the tangent NN'. A radius is dropped from H to B, and radius BK is laid off at angle V equal to angle T from radius BH. The point of intersection of BK and FF' then lies on the required base circle E.

Assume now that the machine is operating at a fixed "tool angle" A. This tool angle corresponds to a rack having a pressure angle or slope of A. A center line YY' is drawn through the center B. Radius BM is laid off at the given tool angle A to intersect circle E at M. At M draw tangent GG'. The point of intersection of this tangent GG' and the center line YY' is on the required circle S, which we may call the "generating pitch circle" to distinguish it from the "rolling pitch circle" referred to above, which is the pitch circle preselected by the designer as that at which the gear must operate when meshed with its mate. The tool L may be a grinding wheel or milling cutter operating with its planular face, and therefore constitutes one side of a rack tooth meshing with the tooth curve P at that pitch circle diameter and pressure angle.

In operation, the work and cutter are adjusted so that the tool L will make contact with the theoretical tooth curve at the intersection of the pitch circle with the tangent GG' of the base circle E. Where the tool is of the rotating type, its diameter may be varied as desired, providing that it is kept large enough to clear the bottom of the tooth gap at the center, and yet cut below the working depth at the sides, as shown in Fig. 5. No particular length of the curve P is required, and either standard or stub teeth may be cut by this method.

In Fig. 5 is diagrammatically shown the mounting of the gear blank Q on the arbor R and its centering beneath the generating wheel L. S' is a segment corresponding to the working diameter S shown graphically in Fig. 4, suitably adapted to accommodate Bilgram bands for effecting translatory and rotative movements of the blank spindle or arbor R; for example in the manner shown and described in U. S. Letters Patent to E. J. Lees, No. 1,390,145, to which reference may be made.

The generating wheel L is rotated by a motor or in any other appropriate manner at the angle A of Fig. 4. The gear blank is rolled into and out of contact with the tool by the same or another drive at a speed which need have no relation to the angular velocity of the wheel L. After the tooth curve of one tooth has been generated, the gear blank is indexed; the above operation is repeated for the next tooth, and so on until the gear is completed.

Of course it will be understood from the foregoing description that in carrying out my improved process, the tool support may be adjusted radially of the blank axis corresponding to the particular sized gear to be generated or ground, and different diameter segments substituted to correspond substantially to the generating pitch circle diameter of the blank to be generated or ground.

It will be obvious that the angle of the tool being fixed, the construction will be considerably simplified, and that the operative makes no adjustment for pressure angle, so that disadvantages resulting from inaccurately set tools are avoided.

In the foregoing description of my invention, I have shown how to proceed to generate gear teeth for use at a given selected pressure angle by means of a tool set at a different pressure angle. In the illustrative case described, the tool pressure angle is greater than the selected pressure angle. It will be apparent that the tool pressure angle might be smaller instead of greater than that selected.

What I claim is:

1. The method of generating the involute teeth of a gear or gear blank of known base circle diameter to have a preselected pressure angle, by engagement with a tool having a working face of different pressure angle, which consists first, of so positioning the gear or blank relatively to the tool face that a tangent to the base circle intersects the tool face perpendicularly at the same point at which the tangent meets a line drawn from the center of the base circle in the plane of the tangent at an angle with the tangent of 90 degrees minus the tool pressure angle; and second, of rolling the gear or blank in engagement with the tool on a circle whose radius is the line from the said center to said point of intersection.

2. The method of generating the involute teeth of a gear or blank of known base circle diameter to have a preselected pressure angle, by engagement with a tool having a working face of different pressure angle which consists of rolling the gear or blank in working engagement with said tool along a line and upon a circle of the gear whose radius is a line lying at an angle of ninety degrees to the line of rolling and drawn from the center of the base circle to a tangent of the base circle which is perpendicular to the working face of the tool.

3. The method of generating the involute teeth of a gear or blank of known base circle diameter to have a preselected pressure angle, by engagement with a tool having a working face of different and fixed pressure angle which consists of rolling the gear or blank in working engagement with said tool along a line and upon a circle of the gear whose radius is a line lying at an angle of ninety degrees to the line of rolling and drawn from the center of the base circle to a tangent of the base circle which is perpendicular to the working face of the tool.

4. The method of generating the involute teeth of a gear or gear blank to have a preselected pressure angle and pitch circle diameter, by engagement with a tool having a working face of different pressure angle which consists first, of determining the gear base circle from the said preselected gear pressure angle and pitch circle in the usual manner, and second, of rolling the gear or blank in working engagement with said tool along a line and upon a circle of the gear whose radius is a line lying at an angle of ninety degrees to the line of rolling and drawn from the center of the base circle to a tangent of the base circle which is perpendicular to the working face of the tool.

5. The method of generating the involute teeth of a gear or blank to have a preselected pressure angle and pitch circle diameter, by engagement with a tool having a working face of different and fixed pressure angle which consists first, of determining the gear base circle from the said preselected gear pressure angle and pitch circle in the usual manner, and second, of rolling the gear or blank in working engagement with said tool along a line and upon a circle of the gear whose radius is a line lying at an angle of ninety degrees to the line of rolling and drawn from the center of the base circle to a tangent of the base circle which is perpendicular to the working face of the tool.

6. The method of generating involute profiles on the teeth of a gear or gear blank of known base circle diameter by engagement with a tool having a working face of known pressure angle which consists first of so positioning the gear or blank relatively to the tool face that a base circle tangent drawn perpendicular to the tool face and a line drawn from the center of the base circle in the plane of the tangent and at an angle with the tangent of 90 degrees minus the tool pressure angle meet at the same point in the tool face; and second of rolling the gear or blank in engagement with the tool on a circle whose radius is the line from the said center to the said meeting point.

7. The method of generating involute profiles on the teeth of a gear or gear blank of known base circle diameter by engagement with a tool having a working face of fixed pressure angle which consists first of so positioning the gear or blank relatively to the tool face that a base circle tangent drawn perpendicular to the tool face and a line drawn from the center of the base circle in the plane of the tangent and at an angle with the tangent of 90 degrees minus the tool pressure angle meet at the same point in the tool face; and second of rolling the gear or blank in engagement with the tool on a circle whose radius is the line from the said center to the said meeting point.

8. The method of generating involute profiles on the teeth of a gear or gear blank of known base circle diameter by engagement with a tool having a working face of known pressure angle which consists first of so positioning the gear or blank relatively to the tool face that a base circle tangent drawn perpendicular to the tool face and a line drawn from the center of the base circle in the plane of the tangent and at an angle with the tangent of 90 degrees minus the tool pressure angle meet at the same point in the tool face; and second, of engaging the gear or blank with the tool and rolling a circle thereof whose radius is the line from said center to said meeting point on a line through said meeting point perpendicular to said radius.

9. The method of generating involute profiles on the teeth of a gear or gear blank of known base circle diameter by engagement with a tool having a working face of fixed pressure angle which consists first of so positioning the gear or blank relatively to the tool face that a base circle tangent drawn perpendicular to the tool face and a line drawn from the center of the base circle in the plane of the tangent and at an angle with the tangent of 90 degrees minus the tool pressure angle meet at the same point in the tool face; and second, of engaging the gear or blank with the tool and rolling a circle thereof whose radius is the line from said center to said meeting point on a line through said meeting point perpendicular to said radius.

In testimony whereof, I have hereunto affixed my signature.

CHARLES H. SCHURR.